United States Patent
Lusty

(10) Patent No.: US 8,296,655 B2
(45) Date of Patent: Oct. 23, 2012

(54) CONTEXT SENSITIVE INFORMATION MANAGEMENT SYSTEM AND METHOD

(75) Inventor: Peter Lusty, High Wycombe (GB)

(73) Assignee: TIS Software Limited, Bourne End (GB)

( * ) Notice: Subject to any disclaimer, the term of this patent is extended or adjusted under 35 U.S.C. 154(b) by 676 days.

(21) Appl. No.: 11/701,962

(22) Filed: Feb. 2, 2007

(65) Prior Publication Data

US 2007/0214416 A1 Sep. 13, 2007

Related U.S. Application Data

(63) Continuation of application No. PCT/GB2005/003059, filed on Aug. 3, 2005.

(30) Foreign Application Priority Data

Aug. 3, 2004 (GB) .................................. 0417300.1

(51) Int. Cl.
  *G06F 3/14* (2006.01)
  *G06F 3/17* (2006.01)

(52) U.S. Cl. ........ 715/708; 345/708; 345/739; 715/759; 715/834; 715/853; 715/740; 715/744; 709/223; 709/225

(58) Field of Classification Search .......... 715/200–277, 715/700–867; 700/701–866; 709/201–229; 705/50–79; 345/30–111; 348/206–231.9; 707/200–206
See application file for complete search history.

(56) References Cited

U.S. PATENT DOCUMENTS

| | | | |
|---|---|---|---|
| 6,236,768 B1 | 5/2001 | Rhodes et al. | |
| 6,262,730 B1 | 7/2001 | Horvitz et al. | |
| 6,654,735 B1 | 11/2003 | Eichstaedt et al. | |
| 7,343,365 B2 * | 3/2008 | Farnham et al. | 715/853 |
| 7,543,237 B2 * | 6/2009 | Kontny et al. | 715/759 |
| 7,734,780 B2 * | 6/2010 | Abbott et al. | 709/225 |
| 7,945,859 B2 * | 5/2011 | Abbott et al. | 715/740 |
| 8,020,104 B2 * | 9/2011 | Robarts et al. | 715/744 |
| 2003/0001875 A1 * | 1/2003 | Black et al. | 345/708 |

(Continued)

FOREIGN PATENT DOCUMENTS

CA 2368845 12/2002

(Continued)

OTHER PUBLICATIONS

Bill N. Schilit, Norman Adams, and Roy Want, Context-Aware Computing Applications, Dec. 8-9, 1994, IEEE Workshop on Mobile Computing.*

*Primary Examiner* — Ruay Ho
(74) *Attorney, Agent, or Firm* — Lawrence G. Fridman

(57) ABSTRACT

A context sensitive information management system and method for use in a system comprising a number of applications each able to display information in response to a user input and a contextual coprocessor. The method comprising the steps of: the contextual coprocessor storing a plurality of context definitions each defining information to be displayed; the user making an input to an application; the application displaying information in response to the user input; the contextual coprocessor identifying a stored context definition corresponding to a current context definition; and the contextual processor displaying the information defined by said identified stored context definition; in which the context definitions stored by the contextual coprocessor are based upon data passing between the application and the user.

29 Claims, 1 Drawing Sheet

U.S. PATENT DOCUMENTS

| | | |
|---|---|---|
| 2003/0191730 A1 | 10/2003 | Adkins et al. |
| 2003/0202009 A1* | 10/2003 | Kasriel .......................... 345/739 |
| 2003/0204573 A1 | 10/2003 | Beck et al. |
| 2003/0217061 A1 | 11/2003 | Agassi et al. |
| 2004/0189685 A1* | 9/2004 | Wong et al. ................... 345/708 |
| 2004/0268259 A1* | 12/2004 | Rockey et al. ................ 715/708 |
| 2005/0028110 A1* | 2/2005 | Vienneau et al. ............. 715/834 |
| 2005/0114493 A1* | 5/2005 | Mandato et al. ............... 709/223 |
| 2005/0166148 A1* | 7/2005 | Garding ......................... 715/708 |
| 2005/0273839 A1* | 12/2005 | Mikkonen et al. ............. 725/135 |
| 2009/0132919 A1* | 5/2009 | Allen et al. .................... 715/708 |

FOREIGN PATENT DOCUMENTS

| | | |
|---|---|---|
| GB | 2378775 | 2/2003 |

* cited by examiner

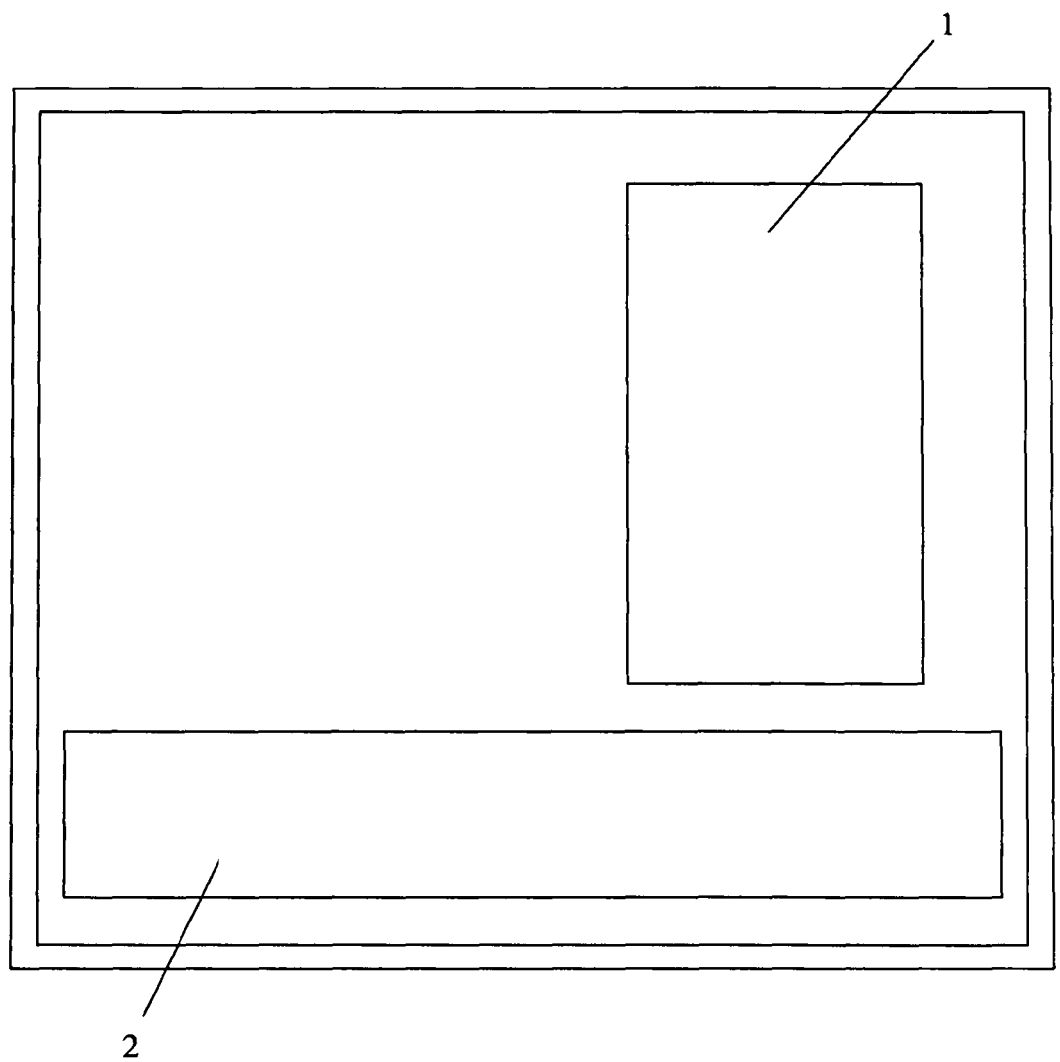

CONTEXT SENSITIVE INFORMATION MANAGEMENT SYSTEM AND METHOD

This is a continuing application of PCT application PCT/GB 2005/003059 filed Aug. 3, 2005 which claims priority of Great Britain patent application GB0417300.1 filed Aug. 3, 2004.

FIELD OF THE INVENTION

This invention relates to a context sensitive information management system and in particular to a context sensitive information management system able to display information relating to a plurality of separate applications, and a corresponding method.

BACKGROUND OF THE INVENTION

Business information management systems operating on computer networks are commonly used to allow business decisions and negotiations to be quickly and efficiently carried out. Such business information management systems often comprise a number of separate applications each having a main database accessible to and updatable by software running on a number of different computers linked by the network. The different business information management applications making up the overall system allow access to different databases and allow their respective databases to be updated to take into account business decisions or actions made by the users.

For example, a product application can allow access to a database of currently available products together with product specifications and product related information such as the number of articles of each product available in stock, delivery times for new product orders and current product prices. Similarly, an accounting application allows access to an accounts database of accounting information such as customer credit limits, current balances and past payment histories.

Thus the specific management functions of the system are carried out by separate software applications which are opened and used as required by users.

The use of such business information management system allows users to make real time decisions on business issues. For example, a product management application can be accessed by a user receiving an enquiry from a potential customer and the product cost, inventory and delivery time information accessed by the application can be used to quote a price and delivery time without any risk of customer dissatisfaction due to the quotation of a wrong price or an unattainable delivery date, or the inadvertent agreement of price which is too low to be economically viable. Similarly, by accessing account information application the user can confirm that the order can be taken from a customer without exceeding a customer credit limit or extending further credit to a customer already in arrears.

Another advantage of such business information management systems is that they allow decision making by different users to be directly based on the information held in the various databases rather then relying on the judgment and memory of the individual user, so that greater consistency in business decision making can be achieved.

In practice a problem which is encountered in using business information management systems is that when a user is using one application it may be necessary to obtain information which is accessed separately through another application which operates independently from the application in use.

Of course, it is always possible for a user using one application and requiring information accessed through another application to open the necessary other application and to find the necessary information using the other application. However, the time taken to do this may well be too long to be acceptable, in particularly while a potential customer is on the telephone waiting for an answer. Further, a procedure requiring a user to recognize that further information is required and available through another application, to identify the other application and then open and use the other application to find the information requires a high level of user understanding and knowledge of the business information management system and requires the user to have a high level of initiative in seeking the desired information.

In order to allow users to quickly find required information many business management applications are arranged to respond to a user request to display a particular item of information by also automatically displaying related items of information. These related items of information are selected when the application software is installed and are items of information which are expected to be likely to be required or significant together with the user requested information. For example a product application may respond to a request for price information about a specific product by displaying the requested price information and simultaneously displaying inventory and delivery time information for that product, even though this has not been specifically requested by the user.

In theory it would be possible to link two separate applications so that one application can obtain information from the other application and display this information to the user. However, such linking together of separate software applications is difficult and expensive to achieve, in practice there may be fundamental differences in the way in which the separate applications operate so that linking the applications will require complex programming. Further, in practice such an approach of interlinking separate applications can only be carried out for a small number of functions in a small number of applications, because the interconnections of the different applications greatly increases the complexity of the business information management system as a whole and reduces the stability and integrity of the system. If it is attempted to provide such links for a large number of functions in numerous applications the complexity of the business information management system grows exponentially and quickly becomes so great that reliable operation of the system can no longer be guaranteed and the system stability and integrity is compromised.

Further, such links between separate applications are set by the programmer who installs the link. Such fixed links cannot be changed by individual users to reflect their own requirements.

Further, if it is desired to increase the range of information which can be accessed and displayed by an application to include new types of information it is necessary to alter the application, for example by rewriting or reprogramming, so that the application is able to directly access and display the required information. However, such altering of an application to extend it to include new types of information is time consuming and expensive. This is particularly the case where the applications are supplied as packaged software. Packaged software is distributed as large volumes of identical software so that there is little or no commercial justification for making significant alterations to the packaged software to be specific to the needs of an individual customer. Finally, in order to allow such linking of separate applications it is necessary to have access to the internal operation of the applications so that the necessary links can be determined and established and it is usually necessary to be able to alter at least some of the applications so that they can access and display the required information. It is possible to link specific applications in this way where the source code or other description of the internal operations of the applications is available and changes can be made to the applications. However, in practice this is rarely the case unless all of the applications have been produced by the same supplier because access to third party source code and rights to alter third party applications is usually not available because of commercial and liability concerns.

As a result, there is a problem that business information management systems are only able to link a small number of specific applications, and that it is difficult or impossible to extend them to link further applications or to change what information is linked.

Another approach has been to provide systems which respond to requests for information by also identifying and supplying related information which may also be of interest. There are two main methods of doing this. The first method is to add link or relationship data to each item of information in an information store, or to the index entry for each item, identifying other items which are regarded as related to the item and which should be so identified and supplied. The second method is for the information supplying system, for example an internet browser, to identify the information or content being requested by a user and to identify other information similar to the requested information, which may also be of interest. Typically this is done by the information supplying system searching for information containing the same keywords or having the same indexing or metadata identifiers for content as the requested information. One problem with this approach is that the selection of information regarded as related to the requested information which is identified to the user is based on predefined fixed links or fixed rules as to what is regarded as similar based on the content of the requested information. As a result, the same further information will always be identified as being related to each item of requested information regardless of the context or situation in which the request is made by the user. A further problem with this approach is that there is a significant cost associated with generating and storing the link or relationship data or indexing or metadata identifiers. Finally, the approach of keyword searching in particular has the disadvantage of generally being unreliable and often identifying information which is not of any interest to the user.

The present invention is intended to overcome these problems, at least in part.

SUMMARY OF THE INVENTION

In a first aspect, this invention provides a context sensitive information management system comprising a number of applications each able to display information in response to a user input to said application, and a contextual coprocessor, the contextual coprocessor being arranged to display further information different from said information in response to said user input, the further information being selected by the contextual coprocessor based upon the application to which said user input was made and a current context definition for said application, current context definition being defined by the contextual coprocessor based upon data passing between the application and the user.

Preferably, the context definition is defined by the contextual coprocessor based upon the data sent for display to a user by the application.

In a second aspect, this invention provides a context sensitive information management method for use in a system comprising a number of applications each able to display information in response to a user input and a contextual coprocessor and comprising the steps of; storing a plurality of context definitions each defining information to be displayed; the user making an input to an application; said application displaying information in response to the user input; the contextual coprocessor identifying a stored context definition corresponding to a current context definition; and the contextual processor displaying the information defined by said identified stored context definition; in which the context definitions stored by the contextual coprocessor are based upon data passing between the application and the user. Preferably, the stored context definition is based upon the data sent for display to a user by the application.

In the system and method according to the present invention, defining or basing the context definition on data passing between the application and the user removes any requirement to have access to the application source code, or other detailed information regarding the internal operation of the application, and any requirement to change the application, for either the application to which the user input was made or the other applications from which the further information may be obtained, only access to data stored by the applications is required.

It will be understood that it will generally be much simpler for the contextual coprocessor to access data stored in a data store associated with an application than it would be to link to the application itself.

Further, because the system and method according to the present invention only require access to the data stored by the applications, the contextual coprocessor only needs to be able to access data stored by the applications and do not need to be able to control or interact with the applications themselves. Accordingly, no joining tool or other interface means to allow the contextual coprocessor to interact with the applications is required.

BRIEF DESCRIPTION OF THE DRAWING

Embodiments of the invention will now be described by way of example only with reference to the accompanying diagrammatic figure, in which:

FIG. 1 shows an example of a display provided by a system according to the invention.

DETAILED DESCRIPTION OF THE INVENTION

The present invention provides a context sensitive information management system comprising a number of information management applications together with a contextual coprocessor. The contextual coprocessor is separate from the applications themselves. The contextual coprocessor is an information management program arranged to operate in parallel with the information management applications accessible through the user terminal.

It will be appreciated that the contextual coprocessor may be a software "application" in the general meaning of the word. However, for clarity, in the present description the word application is used only to refer to information management applications separate from the contextual coprocessor and not to the contextual coprocessor itself.

Each application will usually have an associated data store, typically a database. Each application may operate independently or a number of applications may be grouped together as an application suite. The applications forming an application suite will usually share a common data store or database. The contextual processor may define contexts for an application suite as a whole or each of the applications forming the suite, as convenient. It should be understood that an application referred to in the present description may be an application suite.

The contextual coprocessor program may operate on the user terminal itself or may operate remotely, for example on a server connected to the user terminal. If the contextual coprocessor operates on a server, it may conveniently be accessed by the user through a web browser or other user interface.

The context is in general what the user is currently doing and the context definition is a definition of what is currently being done by the user which allows items of information relevant to the user to be identified. The context definition is based upon user actions such as the applications currently open, any menus, tabs or other controls selected by the user and any other relevant parameters such as customer or product identities. Contexts can be defined for each application which can be accessed by the user terminal.

The contextual coprocessor monitors the information management applications opened and used by the user and maintains a record of the current context in which the user is employing the application currently in use. The contextual coprocessor then uses the current context of the application in use to select and display to the user items of information which are expected to be relevant or useful to or potentially relevant or useful to the user when operating the current application in the current context. Preferably the items of information are selected for display based upon rules which may be set and changed by the user.

In the present invention, the contextual coprocessor maintains a record of the current context in which the user is employing the application currently in use by reviewing the information passing between the user and the application and using the reviewed information to deduce the current context of the application. This allows the contextual coprocessor to determine and record the current context of the application without requiring access to information about operations within the application, or any knowledge of the internal structure or activities of the application. However, access to any data store or database associated with the application may be required in order to obtain the items of information for display to the user. It will generally be much simpler for the contextual coprocessor to access data stored in a data store associated with an application than it would be to link to the application itself.

This provides the advantage that the context sensitive business information management system according to the invention can display to the user items of information which are expected to be relevant or useful to the user when operating the current application in the current context without the contextual coprocessor requiring access to any information about the operation and internal activity of the current application itself.

This also provides the further advantage that the further information displayed to the user is information which has been positively selected as being of possible interest to the user in their current context, the selection being based on the current context using rules either selected on setting up the system or selected by the user, and not merely information selected on the basis of similar content by the use of keywords or indexing or metadata codes. As a result the further information is more likely to actually be of interest to the user than in known systems which identify similar information to requested information based on the content of the selected information. Preferably, the contextual coprocessor deduces the context of an application currently in use based upon the screen dialogue of the application. The screen dialogue may just be the data sent for display to the user by the application. Optionally, the screen dialogue could also include the user inputs sent to the application using a graphical interface.

Preferably, in order to capture the screen dialogue, the contextual coprocessor reads the data fields being displayed to the user by the application, or sent by the application to the user, and compares these to a stored definitions database which defines the current context of the application in terms of displayed data fields.

In addition, or alternatively, the context of the application could be deduced from other available information including other user inputs to the application, dialogue between a user desktop and the application, or, where the application is run on a remote server, dialogue between a user terminal and the application, or dialogue between a web browser client and the application server or web server. The context of the application can of course be deduced based on more than one source of available information. It will be understood that the list of possible information sources is exemplary and not exhaustive.

The use of dialogue by the contextual coprocessor to deduce context allows the contextual coprocessor to deduce the current context of the application without requiring access to the internal operation of the application, or even a detailed understanding of the internal operation of the application. As a result, there is no requirement for the contextual coprocessor to have a joining tool or for access to the source code of the application.

In general, the displayed data fields sent for display by an application are purely human readable visual elements such as character strings or icons intended to convey information to the user and do not include any coding giving a direct indication of the application status. Accordingly, where the context is based in whole or in part on the data sent for display by the application the context must be deduced from these visual elements. This deduction may be based on either or both of the intended display location of the visual elements and the content of the visual elements such as character strings or icons. In general the context sensitive information management system according to the invention will be a system having multiple users each accessing the system through a separate terminal. In this case each user will have a separate contextual coprocessor arranged to display information on their terminal based on the current context or contexts for the user.

In order to allow the invention to be better understood a typical display as provided to a user by the context sensitive information management system according to the invention is shown in FIG. 1. The display includes a first region or window 1 controlled by the application currently being accessed by the user and a second region or window 2 controlled by the contextual coprocessor. The windows 1 and 2, like the currently accessed application and the contextual coprocessor, are entirely separate from and independent from one another. Region 1 generally contains a graphical interface controlled by the application currently in use and useable by the user to request information from this application and one or more display regions where the information provided by the application in response to the user requests can be displayed. The region 2 is used by the contextual coprocessor to display items of information which are expected to be potentially of relevance or interest to the user using the application currently in use in the context in which the application is being used, as currently defined by the contextual coprocessor.

The region 2 may be used directly for the display of actual items of information which may be of interest or may identify types of information which may be of interest together with a graphical interface allowing the user to select items of information from those identified to be displayed or a combination of the two. Typically such a graphical user interface is displayed in the form of a display of items of information and/or a menu, dashboard or button bar identifying a selection of types of information for display and arranged to display items of information of the selected types in response to the user selecting the relevant menu items or buttons.

The contextual coprocessor ensures that the information contained within or selected by the display, menus, dashboard or button bar is relevant to the context in which the user is operating. This provides the advantages that the user does not have to be an expert to understand the information or its relevance and that the user does not have to sort through information irrelevant to their current context in order to find relevant information.

The items of information displayed or offered for selection and subsequent display can include information obtained or obtainable from the application currently in use. The obtained or obtainable information can also include information which is not obtained or obtainable from the application currently in use and even types of information which is not available from the application currently in use. The obtained or obtainable information preferably includes information obtained, or obtainable on selection, by other applications forming part of the system, or by elements of or accessible to the system which are not applications as defined above. The obtained or obtainable information maybe retrieved from outside the system by said other applications or the contextual coprocessor if necessary.

Information types not available from the application currently in use may be either or both of information types not available from the currently open location or screen of the application or information types not available from the application at all.

The context or contexts are defined for each application separately. Accordingly, a context may be defined using a definition including the identity of the application to which it is relevant. However, even if the context definition does not include the application identity the context definition must be associated in some way with the application to which it is relevant.

The definition of the current context in which the user is currently accessing the application will generally include the information request currently being made to the application by the user, or when the definition is based on the data sent for display to the user by the application, the information displayed in response to the most recent request. However, because the contextual coprocessor is separate from the information management application the current context can also be defined by parameters which are not known to or accessible to the application itself. A context definition may be based on the information requested by the user or the information sent for display in response to the request. Further, where the context definition is based on the information requested, the context definition may be based on either or both of the type of information requested and/or the actual value of the information requested. For example, where a user requests information about a product, the context definition may be based on the user making a request for the type of information "product information" regardless of the actual product identified in the request or may be based on the user making a request for the value of the information "identity of product", the actual product identified in the request.

For example, where a user is accessing a product information application and the user requests cost information for a specific product the current context definition defined by the contextual coprocessor could include the parameter that the application currently being accessed was the product information application and that the information currently being requested or displayed was the price of a specific product. However, since the contextual coprocessor is separate from the product information application currently being accessed, the contextual coprocessor is not limited to defining the current context in terms of the user interaction with the product information application. The contextual coprocessor context definition can include further parameters defining the current context which are not available from or known to the product information application. For example, where a user has first opened a customer information application and accessed information regarding a particular customer and subsequently opened the product information application and requested the price of a specific product, the context defined by the contextual coprocessor can include the particular customer identity previously accessed.

The above description refers to user requests for information as being reacted to by the contextual coprocessor and used to define the current context of the application. The user requests or inputs are referred to for clarity, but it should be understood that the contextual coprocessor can also be arranged to react to, and to define the current context by, the replies sent by the application in response to the user requests or inputs and that requests or inputs and the replies can be deduced from one another. Accordingly, in general a user request or input and the application response should be regarded as synonymous. The contextual coprocessor can then respond to the user request to the product information application for price information about a particular product in this context where there has been a preceding request for information about a particular customer by displaying as related information which may be of interest, not only related product information such as price, inventory and expected delivery times but also information related to the particular customer and product combination such as when an order for that product was last placed by that customer, the amount ordered, the price charged and any problems or queries resulting. Further, the contextual coprocessor may also display information relating to the particular customer but not related to the product, such as credit limits or past payment history.

This information is not available from or through the product information application itself. However, this is not a problem because the contextual coprocessor is separate from the applications and so can access any desired information from any of the supported information applications such as a customer information application or an account information application without requiring these applications to be linked directly to the product information application or opened or investigated by the user.

The current context for an information application currently in use can be as detailed as desired and can include as a parameter any information available to the contextual coprocessor and is not limited to information which is available through the information application in use, even though the current context is defined for the information application in use.

The parameters used by the contextual coprocessor to define the current context for an application in use can include the application currently in use, the information currently being requested or displayed, and the history of applications accessed by the user in the past, the information requested from those applications and the information received in reply to these requests. Further, in most cases it will be possible for a user to have multiple different information applications open simultaneously with one application being the foreground application currently being used and the other applications running as background applications. When this is the case the context defined by the contextual coprocessor for the foreground application currently being used can include as parameters the identities of any other applications open in the background and the previous or most recent operations carried out on or information received from any or each of these background applications when they were last used or previously used.

For example, where a user first opens and uses a customer information application to request information about a particular customer and subsequently opens a product information application and requests information about a particular product, leaving the customer information application running in the background, the contextual coprocessor can respond to the request for information about that product in this context where the product information application is open and in use in the foreground and the customer information application is open and displaying information about a particular customer in the background by displaying information relating to the product, the customer and to the customer in combination with the product as discussed above.

Further, the reverse may also apply. Where the product information application was used and then left open in the background while the customer information application was used, the contextual coprocessor could respond to a request for information about a particular customer from the customer information application in this context that the product information application was opened as a background application displaying information relating to a particular product by displaying information relating to the customer and the product and to the customer in combination with the product.

It should be understood that the information displayed in these two cases is not necessarily the same.

The contextual coprocessor can be considered as defining a number of templates each corresponding to a particular context for a particular application and specifying items of information to be displayed in response to each possible information request for each defined context.

Each time the user makes an input to, or alternatively or additionally each time the user receives an output from, an information processing application the contextual coprocessor attempts to identify the current context for the application in use. It is possible that the context may not change or that the information processing application may move into a state which does not correspond to any defined context. However, when the contextual coprocessor can identify a new current context the contextual coprocessor identifies the information specified by the current context to be provided by the contextual coprocessor in response to the request and obtains and displays the specified information to the user in the region 2. This information to be provided by the contextual coprocessor is independent from and different to the information provided by the information processing application itself at this point in the dialogue between the application and the user. Most commonly the user input is an information request and the application output is a response thereto and this is the main example of a user input discussed herein. However, other user inputs and their responses may be taken into account by the contextual coprocessor. Examples of other user inputs include opening a new application or changing a tab setting.

Optionally the contextual coprocessor may be arranged to compare the items of information which it should display in response to the most recent information request of the user with the information which it displayed in response to the last information request of the user. If the information to be displayed is the same the contextual coprocessor may not again obtain the information but may simply maintain the display of the same information. The advantage of this procedure is that this may reduce the number of information accessing operations carried out by the contextual coprocessor. However, this has, the disadvantage that the information displayed to the user by the contextual coprocessor may not be entirely up to date. Accordingly, to avoid this difficulty, the contextual coprocessor may be arranged to compare the items of information to be displayed in response to the most recent user information request to the items of information which were displayed in response to the previous user information request and where the items of information are the same the time which has elapsed since the items of information were last accessed can be compared to a threshold and the information re-accessed only if the length of time since the information was accessed exceeds the threshold.

In addition to current and past user information requests and the replies thereto and the foreground and background information management applications accessed by the user there are other parameters which can also be used to define the context. For example, in addition to actual information requests, user defined settings and parameters for the business information applications can also be used to define the context. For example, the tabs currently open or menu items selected in an open application to control the operation of that application can be taken into account by the contextual coprocessor in defining the context.

The context may also be based upon the user identity or function. This may be done by storing defined contexts for each user or class of user and retrieving and using only the appropriate set of stored context definitions for each user. The user identity may either be defined explicitly by using a user identifier such as log on ID for each user of the system, or implicitly by having a stored set of context definitions for each terminal able to access the system and assuming that the user for each terminal is always the same user or class of user.

It will be understood that different users or classes of user in an organization may be interested in different aspects of information held on the system regarding the activities of the business, such as its customers and products or services. For example, personnel responding to customer telephone orders may have different priorities and interests to accounts staff investigating late paying customers.

The potential number of contexts which can be defined for any particular user information enquiry are very large. Potentially, for each application accessible by the system every possible value of every parameter which can be accessed by the contextual coprocessor could define a different context. However, in order to define a context only those parameters which are of interest need to be specified, the contextual coprocessor can ignore any undefined parameters which are not regarded as being significant in defining the contexts for a particular application or user information request within that application.

It is possible for the context definitions and the information to be displayed by the contextual coprocessor in each defined context to be centrally defined for all contextual coprocessors in the context sensitive information management system. However, it is preferred that individual users should be able to define and save their individual user specific context definitions and specifications of the information to be displayed in response to each defined context for their respective contextual coprocessors so that each user can be presented with the information which is most useful and relevant to them when accessing the information management system.

In this description the user inputs are referred to as user information requests. However, the user inputs are not necessarily direct requests for specific items of information. For example, a user accessing an application could change a tab setting of the application or a user could open a new application. These user actions do not directly request the display of specific items of information. However, they will generally result in different information being displayed to the user on the user terminal or are intermediate steps required to allow the user to access particular items of information. Accordingly, such user actions should be regarded as acting as user information requests as discussed herein.

For example, in the examples discussed above where the user has opened a customer information application and requested information on a particular customer and then opened a product information application to access information on a particular product, if the user then opens an accounts information application the contextual coprocessor could be instructed to respond to the opening of the accounts information application in the context of the customer information application being open in the background or having previously been opened to access a particular customer by displaying information relating to the account held by that customer, even though no specific information has been requested from the accounts information application. It should be understood from the above that where multiple applications are open on a terminal the current context for each of the applications is different so that if a user moves between different applications, as each application becomes the foreground application currently being accessed by the user the information displayed by the contextual coprocessor will change to be the information specified for display for the foreground application in the current context for that application. By different it is meant that the current context and the information to be displayed by the contextual coprocessor in the current context is independently defined for each application. It is of course possible that some of the information specified to be displayed by the contextual coprocessor will be the same.

The advantages of the present invention of having a contextual coprocessor separate from the applications themselves and defining contexts for different states of the applications and information to be displayed by the contextual coprocessor in response to user actions in these defined contexts for the different applications are that the context definitions and displayed information are not limited to parameters and information which can be accessed or handled by the applications themselves. The contextual coprocessor can define the context in terms of any desired parameter regardless of whether or not the parameter is supported by the currently accessed application for which the context is defined and can display information derived from any source accessible to the contextual coprocessor through the information processing system as a whole and not just information accessible through the currently accessed application. For example, information may be obtained by the contextual coprocessor opening other applications and the relevant information being obtained from the opened applications by the contextual coprocessor.

This allows a user information request in a currently accessed information processing application to be responded to by also displaying items of information potentially of interest from the data store of another application with the selection process being based upon current and past user actions in relation to any of the current application, the other application acting as the information source or further applications without the enormous and generally prohibitive complexity penalties of directly interconnecting all of the applications themselves. Further, the use of a contextual coprocessor separate from the applications according to the present invention allows flexible user definition of what parameters are to be responded to by displaying that information without any changes to the applications themselves being necessary even when the definitions require the parameters responded to or the information displayed to include parameters or information not accessible by or supported by the application in use at that time.

Further, where alerts regarding significant events notified to the system are to be distributed to users through the system, the contextual coprocessor can be used to control which alerts are reported to each user.

In general, in information management systems, events or changes in information, such as product inventory, client addresses, product prices etc., are distributed to users by updating the relevant entries in the system database or databases so that the updated information will be retrieved by users in future. This retrieval may be carried out by later onscreen enquires by users or by users having previously requested that specific changes or events be reported to them. However, some events may be significant enough that it is desirable that they should be immediately brought to the attention of users in the form of alerts or warnings. It is known to send such alerts to users of a business information system by sending the alert information to all users system or to a defined class or classes of users on the system.

This often results in the problem that users are presented with large numbers of alerts and that most of the alerts received by any user are not relevant to that user. This not only results in reduced efficiency as users continually have to review and delete or cancel irrelevant alerts but also tends to cause the problem that users assume that alerts will probably be irrelevant and delete or cancel them without properly considering their significance.

These problems can be overcome by using the contexts of the applications currently open on a user terminal to determine whether alerts should be forwarded to a user or not. In order to do this, in addition to defining information to be displayed automatically to a user the context definitions will also define what alerts should be forwarded to the user. It would be possible for alerts to be forwarded to a user based only on the currently open foreground application and its current context. However, in order to ensure that all relevant alerts are forwarded to each user it is preferred that the contextual coprocessor should use the current contexts of all open applications for the user including both foreground and background applications and forward the alert to the user if any of the application contexts specify that the alert should be reported. This will ensure that alerts are properly forwarded even when users are moving between multiple open applications of interest.

Thus, alerts are treated by the contextual coprocessor like any other item of information and are selected to be reported to a user based upon the current application context, with the exception that it is preferred that alerts relating to application contexts for applications currently open in the background are also reported.

This ensures that all relevant alerts are forwarded to each user without large numbers of irrelevant alerts being reported to each user.

An example of an alert would be a particular customer breaching their account credit limit. In general, this information would be entered into the relevant customer and/or accounts databases and would then be accessible to users through the relevant information processing applications and will also automatically be reported to a user accessing information on that customer or orders by that customer in future by the users contextual coprocessor, when relevant. However, in order to ensure that further orders from the customer are not processed after they have reached their credit limit an alert identifying the customer and specifying that they have reached their credit limit can be sent out. This alert will then be forwarded by the contextual coprocessors only to users who currently have an information application open identifying that customer. For example users currently having an account information application or customer information application open identifying that customer or warehouse personnel with an order shipping application open identifying an order for that customer. Thus ensuring that these users are aware that the customer has reached their credit limit before accepting further orders or shipping goods, even if the processing of such orders or shipping preparation is already in progress. In the present application the term contextual coprocessor is used. It is envisaged that in most applications this will be a functional application provided on a computer by suitable software. The term contextual processor is not intended to require the use of a dedicated processor device.

The user terminal can conveniently be a computer such as a PC connected to a network. However this is not essential.

The examples above are not intended to be exhaustive and the scope of the present invention is as defined in the attached claims.

What is claimed is:

1. A computer system, comprising:
   at least a processor and a memory configured to carry out operation of a context sensitive information management system, said context sensitive information management system comprising a plurality of applications, an individual/separate database is maintained for each said application, each said application able to display information in response to a user input to said application, the applications including at least a first application, said first application having a first individual application database is maintained for said first application;
   wherein the first individual application database is arranged for receiving and storing information from the first application, and a contextual coprocessor that is separate from the applications and operates in parallel with the applications;
   the contextual coprocessor being arranged to automatically display further information different from said information in response to said user input to the first application; and
   the further information being automatically selected by the contextual coprocessor from a second individual application database, which is associated with a second application, said selection of the further information being based upon the first application to which said user input was made and a current context definition for said first application, said current context definition being defined by the contextual coprocessor based upon data passing between the first application and the user,
   wherein the contextual coprocessor is arranged to access the second individual application database to obtain the further information when the second application is not open by bypassing the second application and accessing the second individual application database directly.

2. A system according to claim 1, in which the context definition is defined by the contextual coprocessor based upon the type of data sent for display to a user by the application.

3. A system according to claim 2, in which the context definition is defined by the contextual coprocessor based upon the location on a display of data sent for display to a user by the application.

4. A system according to claim 3, in which the context definition is defined by the contextual coprocessor based upon the content of data sent for display to a user by the application.

5. A system according to claim 1, in which the context definition is defined by the contextual coprocessor based upon user inputs to the application.

6. A system according to claim 1, in which the first application runs on a server separate from the user terminal and the context definition is defined by the contextual coprocessor based upon dialogue between the user terminal and the application server.

7. A system accordingly to claim 1, wherein in the plurality of said applications each application is able to display information from its associated individual database.

8. A system according to claim 7, in which the further information is obtained from another one of said plurality of applications.

9. A system according to claim 7, in which the current context definition is specific to said application.

10. A system according to claim 9, in which the system has a plurality of users and the current context definition is specific to a user.

11. A system according to claim 7, in which the current context definition includes the identity of other applications which are currently open.

12. A system according to claim 11, in which the current context definition includes the current status of the other open applications.

13. A system according to claim 1, in which the current context definition includes previous user actions.

14. A system according to claim 13, in which the previous user actions include information requested by the user from other applications.

15. A computer system comprising at least a processor and a memory to carry out a context sensitive information management method for use in a system comprising a plurality of applications, an individual/separate database is maintained for each said application, each said application able to display information in response to a user input, said applications including at least a first application, said first application having a first individual application database for receiving and storing information from the first application, said first application being arranged to obtain information from the first individual application database and to display obtained information to the user, and a contextual coprocessor that is separate from the applications is arranged to operate in parallel with the applications, the method including the steps of:
   storing a plurality of context definitions each defining further information to be displayed;
   the user making an input to the first application;
   said first application displaying information in response to the user input;
   the contextual coprocessor automatically identifying a stored context definition corresponding to a current context definition, said stored context definitions being based upon data passing between the application and the user; and
   the contextual coprocessor automatically obtaining and displaying the further information defined by said identified stored context definition, said further information being obtained from a second individual application database that is associated with a second application by the contextual coprocessor accessing the second individual application database when the second application is not open by bypassing the second application and accessing the second individual application database directly.

16. A method according to claim 15, in which the stored context definitions are based upon the type of data sent for display to the user by the application.

17. A method according to claim 16, in which the stored context definitions are based upon the location on a display of data sent for display to the user by the application.

18. A method according to claim 16, in which the stored context definitions are based upon the content of data sent for display to the user by the application.

19. A method according to claim 15, in which the stored context definitions are based upon user inputs to the application.

20. A method according to claim 15, in which the application runs on a server separate from the user terminal and the stored context definitions are based upon dialogue between the user terminal and the application server.

21. A method according to claim 15, wherein each of the plurality of said applications is able to display information from its associated database.

22. A method according to claim 21, in which the displayed information is obtained from another one of the plurality of applications.

23. A method according to claim 21, in which the current context definition is specific to said application.

24. A method according to claim 15, in which the system has a plurality of users and the current context definition is specific to a user.

25. A method according to claim 21, in which the current context definition includes the identity of other applications which are currently open.

26. A method according to claim 25, in which the current context definition includes the current status of the other open applications.

27. A method according to claim 15, in which the current context definition includes previous user actions.

28. A method according to claim 27, in which the previous user actions include information requested by the user from other applications.

29. A non-transitory computer readable storage medium arranged to cause a computer to carry out a method according to claim 15.

* * * * *